United States Patent Office 3,226,182
Patented Dec. 28, 1965

---

3,226,182
PURIFICATION OF CRUDE CYANOGEN CHLORIDE
Joseph Francis Martino, Hillside, N.J., assignor to American Cyanamid Company, Stamford, Conn., a corporation of Maine
No Drawing. Filed Aug. 7, 1962, Ser. No. 215,257
6 Claims. (Cl. 23—14)

This invention relates to a new and improved method for purifying gaseous cyanogen chloride contaminated with varying amounts of hydrocyanic acid and/or elemental chlorine.

Much commercially available cyanogen chloride is obtained from the reaction of hydrocyanic acid (HCN) and elemental chlorine. Theoretically, this reaction requires equimolar amounts of HCN and chlorine. Provided this relationship is strictly maintained and the by-product hydrochloric acid removed, cyanogen chloride of very high purity can be produced. In practice, however, due to unbalance of the reactants, the product cyanogen chloride gas may contain an excess of as much as 4% hydrocyanic acid entrained therein. In general, of the two impurities, it is desirable to have an excess of HCN, rather than an excess of chlorine. This is because a slight excess of the latter gives rise to serious stability and corrosion problems in storage. However, it is not always possible to avoid an excess of the latter ($Cl_2$) and at times up to 2.0% of this impurity is present in the cyanogen chloride gas.

While the presence of free HCN in the cyanogen chloride gas aids in preventing an excess of the much more troublesome impurity, chlorine, it is often desirable, prior to using cyanogen chloride for specific purposes, to obtain it in a high state of purity. This means a cyanogen chloride product having no more than about 0.1% of either chlorine or excess HCN.

At the present time, there is not available a convenient and efficient method for interchangeably removing the aforementioned impurities from cyanogen chloride, although purification methods of sorts are available. One known method for purifying cyanogen chloride involves three steps. The first is to condense the raw cyanogen chloride gas to a liquid. This liquid is treated with an aqueous suspension of zinc oxide to remove HCN and any hydrochloric acid resulting from hydrolysis. The cyanogen chloride is isolated from the aqueous phase by distillation to remove water. This system has several drawbacks. It is not designed to remove excess chlorine if such is present in the raw cyanogen chloride. It requires the conversion of the cyanogen chloride gas to a liquid and the subsequent vaporization thereof. Other available means for purifying cyanogen chloride likewise present one or more of these difficulties.

There is therefore a need in the art for a simple and effective method for removing HCN and chlorine impurities from raw cyanogen chloride gas. It is an object of this invention to provide such a method. Other objects will be made apparent by the following description.

In accordance with the present invention, a simple, though highly effective, method for effecting the desired purification has been found. The improved method comprises effecting contact between the impure cyanogen chloride vapor and an aqueous system containing suspended calcium carbonate and a dissolved ferrous salt. As the cyanogen chloride vapor passes through the aqueous suspension, excess HCN or, if present, excess chlorine are removed almost quantitatively. Cyanogen chloride thus purified and still in the gaseous state is eminently suitable for use in the catalytic synthesis of various triazines and the preparation of guanidine derivatives.

It is an advantage of this invention, that purification can be effected on a continuous basis with uncomplicated equipment. This can be accomplished by intimately contacting the impure gas with the aqueous carbonate slurry containing a dissolved ferrous salt, and then collecting the substantially pure cyanogen chloride as the off gas. A suitable vessel may be a conventional scrubber column, having inlet and outlet openings for the cyanogen chloride vapor, and inlet and outlet openings for the fresh and exhausted aqueous reagent.

The amount of the ferrous salt and carbonate present in the scrubber column can, of course, be varied to conform to the amount of HCN and chlorine present in the raw cyanogen chloride gas. Requirements for replenishing each of these purification reagents as exhausted can be determined by analysis of impurities in the incoming raw cyanogen chloride gas, and the analysis of the off gas. For quantitative results, at least one-half mole of ferrous salt and one mole of carbonate, should be present for each mole of HCN in the impure gas. However, when the impure gas contains excess chlorine as the impurity, three moles of the ferrous salt are required for each mole of the chlorine impurity. In practice, it is generally desirable to have an excess of both the ferrous salt and the carbonate in the slurry over that required for theoretical removal of all of the impurities which may be present in the raw gas. However, too great an excess of either reagent may be uneconomical, and should be avoided.

In operating on a continuous basis, the slurry, after it has been in contact with the impure cyanogen chloride, may be removed from the area of contact, steam stripped to recover dissolved cyanogen chloride and discarded.

The method of purification in accordance with the present invention can be better understood by reference to the following equations showing reaction of the ferrous salt and the carbonate and such impurities as may be present in the cyanogen chloride vapor. For convenience, the reaction is shown using ferrous sulfate and calcium carbonate as the purifying reagents.

(1) $3FeSO_4 + 6HCN \rightarrow Fe_2Fe(CN)_6 + 3H_2SO_4$ (2) $CaCO_3 + H_2SO_4 \rightarrow CaSO_4 + H_2O + CO_2$ (3) $3FeSO_4 + Cl_2 \rightarrow Fe_2(SO_4)_3 + FeCl_2$ Instead of ferrous sulfate, other ferrous salts can be equivalently used. These include ferrous acetate, ferrous bromide, ferrous carbonate, ferrous chloride, ferrous fluoride, ferrous fluosilicate, ferrous hydroxide, ferrous iodide, ferrous lactate, ferrous nitrate and ferrous oxalate.

Likewise, instead of calcium carbonate, other carbonates may be used with equivalent results. These include barium carbonate, bismuth basic oxycarbonate, cadmium carbonate, cerium carbonate, chromium carbonate, cobalt carbonate, copper carbonate, lead carbonate, lithium carbonate, magnesium carbonate, manganese carbonate, mercurous carbonate, nickel carbonate, silver carbonate and zinc carbonate.

However, because of availability and cost, the preferred ferrous salt is ferrous sulfate and the preferred carbonate is calcium carbonate.

It is a further advantage of the present invention that cyanogen chloride can be purified at ambient temperatures and pressures, thereby dispensing with the need for costly equipment and high energy input. The pH in the scrubber is of critical importance, effecting the efficiency of the purification. Within the range of about pH 4.8 to pH 5.3, purification, i.e., removal of HCN and/or chlorine, is virtually quantitative. Below 4.8 pH, purification becomes less efficient, though still satisfactory.

The following example is presented to illustrate the present invention.

Example 1

Two hundred seventy pounds of an aqueous slurry containing 220 pounds of water, 34 pounds of ferrous sulfate in solution and 16 pounds of calcium carbonate in suspension was charged into a 65 gallon scrubber equipped with an eductor for drawing and contacting raw gas with the slurry. The scrubber was also equipped with two inlet and two outlet ports for circulating the slurry through a heat exchanger and the eductor by means of a circulating pump. A stream of raw cyanogen chloride gas was drawn into the circulating slurry at the rate of 0.7 pound per minute until the pH of the slurry was reduced from 6.2 to 4.8, at which time ferrous sulfate solution containing 3.1 lbs./gal. as the septihydrate and an aqueous suspension of calcium carbonate containing 1.8 lbs./gal. were fed simultaneously into the circulating slurry at the rate of 3.2 gals./hr. of ferrous sulfate solution and 5.1 gals./hr. of aqueous calcium carbonate suspension. The calcium carbonate feed rate was ultimately varied during continuous operation to maintain a slurry pH of not lower than 4.8. The *spent* slurry was discharged at the same rate that the *fresh* slurry was fed, by overflowing from the spent slurry outlet port to a stripping tank where any dissolved cyanogen chloride was removed by steam and conducted to the drying column with the main product stream. The stripped slurry was discarded.

During a period of 29.4 hours of operation, the hydrocyanic acid content of the feed gas varied from 0.5 weight percent to 2.7 weight percent, averaging about 1.6% for 24 hours. In the remaining 5.4 hours of operation, the chlorine content of the feed gas varied from 0.10 wt. percent to 0.90 wt. percent, averaging about 0.50 wt. percent. The average analysis of the product gas, based on 50 analyses made periodically, showed less than 0.10 wt. percent HCN during the 24 hour operating period and neither HCN nor chlorine during the 5.4 hour period.

At the end of 29.4 hours, 290 pounds of ferrous sulfate and 136 pounds of calcium carbonate had been used. Twelve hundred fifteen pounds of raw gas had been processed and eleven hundred ninety pounds of pure cyanogen chloride were produced.

Other soluble ferrous salts and insoluble carbonates, as noted above, give similar results when substituted in the procedure of Example 1.

I claim:

1. In the process of purifying raw cyanogen chloride gas contaminated with varying amounts of HCN and chlorine, the improvement which comprises contacting said raw gas with a slurry containing a soluble ferrous salt and an insoluble carbonate; and then recovering the purified cyanogen chloride gas therefrom.

2. The process of claim 1 wherein the pH of the slurry is between about 4.8 and 5.3.

3. The process of claim 1 wherein the ferrous salt is ferrous sulfate.

4. The process of claim 1 wherein the carbonate is calcium carbonate.

5. The process of claim 1 wherein at least about one-half mole of ferrous salt and one mole of carbonate are present for each mole of HCN in the raw cyanogen chloride gas.

6. In the process of purifying cyanogen chloride gas contaminated with varying amounts of HCN and chlorine, the improvement which comprises contacting said raw gas with an aqueous slurry maintained at a pH between about 4.8 and 5.3, containing at least about one-half mole of ferrous sulfate and one mole of calcium carbonate, per mole of HCN in the impure gas; and thereafter recovering the purified cyanogen chloride gas substantially free of HCN and chlorine impurities.

References Cited by the Examiner

UNITED STATES PATENTS

| | | | |
|---|---|---|---|
| 2,391,490 | 12/1945 | Thurston et al. | 23—14 |
| 2,641,527 | 6/1953 | Leutz | 23—2 |

MAURICE A. BRINDISI, *Primary Examiner.*